3,567,804
PROCESS OF MAKING LIGHT-POLARIZING FILMS FROM VINYL CHLORIDE POLYMERS
Yasunori Nishijima, Kyoto-shi, Sumio Takadono, Namerikawa-shi, Morio Watanabe, Uozu-shi, Taisuke Saito, Namerikawa-shi, and Kazuo Miyoshi, Uozu-shi, Japan, assignors to Nippon Carbide Kogyo Kabushiki Kaisha, Tokyo, Japan
No Drawing. Filed May 20, 1968, Ser. No. 730,506
Claims priority, application Japan, May 30, 1967, 42/33,960; June 1, 1967, 42/34,506; Oct. 21, 1967, 42/67,622; Oct. 23, 1967, 42/67,833
Int. Cl. B29d 11/00; G02b 5/30
U.S. Cl. 264—2         8 Claims

ABSTRACT OF THE DISCLOSURE

A solution comprising a vinyl chloride polymer, a specified weakly basic amine or nitrogen containing heterocyclic compound as conversion agent and a solvent is cast to prepare a sheet. The sheet containing said conversion agent is subjected first to heating and then to stretching or vice versa to obtain a light-polarizing film. The resulting product has a color of blue-purple-reddish orange and shows good dichroism throughout all of the visible spectrum. The product is uniform in optical properties over a wide area as well as excellent in chemical and mechanical properties. The dichroism can be varied in a wide range by changing the stretching ratio. The process is simpler than the prior processes, resulting in a lower cost of the product. The process involves a reaction throughout the polymer sheet producing a larger number of conjugated polyene linkages which are responsible for the light polarization phenomenon.

---

The present invention relates to a process of making light-polarizing films from vinyl chloride polymers.

The conventional light-polarizing films are made from raw films of polyvinyl alcohol. The raw films are stretched and then absorbed with dichroic materials such as iodo-compounds. However, they are poor in the yield of manufacture, which results in an extremely high cost of the final product. Therefore, practical utilizations of them in broad areas have been far from practice nevertheless various applications of them are deemed to be possible. Besides, the conventional products promptly fade out in contact with water and lose their dichroism, which renders them impractical in outdoor uses for an extended period of time even if they are laminated with some other materials. Accordingly, a practical process to make inexpensive broad-size light-polarizing films excellent in water-resisting properties has been long-awaited.

One of the proposed processes to make light-polarizing films from polyvinyl chloride is disclosed in U.S. Pat. No. 2,572,315 (1951). This prior process comprises dipping a film of polyvinyl chloride in a solution containing a strong alkali such as trimethyl benzyl ammonium hydroxide, potassium hydroxide or sodium hydroxide as conversion agent to allow the alkali to be absorbed into the film, and subjecting the alkali-treated film to stretching in one direction and then to heating treatment. In this prior process, however, since the inverting agent is a very strong alkali, it can not be incorporated in the polyvinyl chloride film in the course of preparing the film and therefore it must be absorbed into the prepared film in the form of solution. In fact, it is impossible to prepare a homogeneous film if the strong alkali is contained in the dope, because considerable reactions take place to give rise to gels or precipitates when the polymer is being dissolved. Furthermore, the strong alkali is solid at the room temperature and is incompatible with vinyl chloride polymers. As a result, even though it is absorbed into the film in the form of solution, uneven spots are produced in the film and only nonuniform or opaque products can be obtained, unless extradordinary cares are taken. The strong alkali reacts with or decomposes ordinary solvents or plasticizers for vinyl chloride polymers to give rise to various undesirable effects. Also, as its boiling point is extremely high, it remains in the product and accelerates the aging deterioration of the product. These disadvantages render the prior process impractical to manufacture light-polarizing films on an industrial scale.

The object of the present invention, therefore, is to provide a practical process of making light-polarizing films which are uniform in optical properties over an extended area, excellent in water-resisting properties and showing good dichroism throughout all of the visible spectrum.

The present invention provides a process of making light-polarizing films showing dichroism throughout all of the visible spectrum which comprises casting a solution containing a vinyl chloride polymer, a nitrogen-containing organic compound selected from the group consisting of organic amines and nitrogen-containing heterocyclic compounds, and a solvent for the said polymer to prepare a vinyl chloride polymer sheet, and subjecting the said sheet to heating at 70–220° C. and stretching in one direction, the said nitrogen-containing organic compound being liquid at the room temperature, having a boiling point not higher than the said heating temperature and acting as weakly basic nucleophilic agent. Hereinafter, the nitrogen-containing organic compound selected from the group consisting of organic amines and nitrogen-containing heterocyclic compounds, which is employed in the present invention, is referred to as simply N-containing organic compound.

The vinyl chloride polymers employed in the present invention include polyvinyl chloride; copolymers of at least 80% by weight of vinyl chloride and at most 20% by weight of other unsaturated compounds, corpolymerizable with vinyl chloride; chlorinated polyvinyl chloride containing chlorine of not more than 62% by weight and the mixtures thereof. The copolymerizable unsaturated compounds include carboxylic acid vinyl esters such as vinyl acetate, vinyl propionate, vinyl butyrate, and vinyl benzoate; vinyl halides other than vinyl chloride such as vinylidene chloride and vinyl bromide; vinyl cyanides such as acrylonitrile and methacrylonitrile; unsaturated acid esters such as methyl, ethyl, n-butyl, n-hexyl, n-octyl and 2-ethylhexyl esters of acrylic or methacrylic acid; vinyl ethers such as vinyl methyl ether, vinyl isobutyl ether, vinyl n-octyl ether, vinyl lauryl ether, vinyl cetyl ether and vinyl stearyl ether; vinyl ketones such as vinyl methyl ketone and vinyl n-hexyl ketone; N-vinyl compounds such as vinyl carbazole and vinyl pyrrolidone; olefines such as ethylene, propylene, butylene and isobutylene; and aromatic vinyl compounds such as styrene, p-chlorostyrene and o-chlorostyrene.

If a copolymer containing combined vinyl chloride of less than 80% by weight or a chlorinated polyvinyl chloride containing chlorine of more than 62% is employed, the employed polymer renders the extent of conjugation in polyenes, that is, the light-polarizing elements, to be small, which results to poor light-polarizing properties.

The vinyl chloride polymer together with an N-containing organic compound is dissolved in a suitable solvent in order to prepare a raw sheet by way of the so-called solvent casting method.

The N-containing organic compounds employed in the present invention are to be liquid at the room temperature, to have a boiling point not higher than the heating temperature applied in the process and to act as weakly basic nucleophilic agent.

If the N-containing organic compound is not liquid at the room temperature, it crystallizes out in the raw sheet to make the sheet nonuniform or opaque.

If the boiling point of the N-containing organic compound is higher than the heating temperature, considerable amounts of the compound remains in the product which accelerates the aging deterioration of the product.

If an N-containing organic compound which is strongly basic is employed, the polymer decomposes to give rise to gels or precipitates in the course of preparing the dope to be cast into the raw sheet, so that no uniform sheet can be obtained. Besides, strongly basic compounds often react with or decompose solvents or plasticizers.

The N-containing organic compounds which can be employed in the present invention include tertiary aliphatic amines such as triethylamine, tri-n-propylamine, tri-n-butylamine and tri-t-butylamine; secondary aliphatic amines such as diethylamine, di-n-propylamine, di-n-butylamine, di-isobutylamine, di-n-amylamine, di-iso-amylamine and di-cyclohexylamine; primary aliphatic amines such as n-propylamine, n-butylamine, n-amylamine, allylamine and cyclohexylamine; aliphatic diamines such as ethylene diamine, trimethylene diamine and tetramethylene diamine; aromatic amines such as aniline, N-methyl aniline, N-ethyl aniline, N,N-dimethyl aniline and N,N-diethyl aniline; and nitrogen-containing heterocyclic compounds such as pyridine, picoline, lutidine, piperidine, pyrrolidine, N-methyl pyrrolidine and morpholine. Among these, aliphatic amines are the most preferable, the activity of which increases in the order of primary<secondary<tertiary.

The amount of the N-containing organic compound to be used ranges from 1/10–1/500 mole per one gram atom of combined chlorine contained in the vinyl chloride polymer. The reaction takes place extremely slowly when the amount of N-containing organic compound is beneath the lower limit. On the other hand, when the upper limit is exceeded there is a tendency to produce only short conjugated polyene segments and consequently the high dichroic properties necessary for the desired polarizing effects are not achieved.

The N-containing organic compounds are soluble in the solvents for vinyl chloride polymers, hardly reactive in solutions because they are weakly basic, and activated only after the solution is cast into a sheet. The dope, therefore, is stable and forms neither gels or precipitates, which makes it possible to prepare a uniform sheet with even thickness by way of the solvent casting method.

Since preparation of sheets even in thickness is required in view of uniformity in optical properties of the product light-polarizing film, the solvent casting method is the best way to prepare raw sheets for the manufacture of light-polarizing films, according to the present invention. Other methods such as extrusion and calender methods are impractical because undesirable reactions take place during the preparation of sheets and the sheets color yellowish brown to reddish brown.

According to the present invention, it is not necessary to get the N-containing organic compound absorbed into a prepared sheet from a solution as in the conventional processes, which leads to simplification of the process and reduction in the cost of manufacture.

The solvents are preferably to be as volatile as possible. The solvents include, for examples, single solvents such as tetrahydrofuran, acetone, methyl ethyl ketone, methylene chloride and ethylene chloride as well as mixed solvents of these single solvents with such solvents as benzene, toluene, carbon disulfide, cyclohexan, ethylene trichloride, carbon tetrachloride and chloroform.

The preferable concentration of polymer in the dope ranges 10–22% by weight. The preparation of the dope is performed most preferably in an autoclave. For instance, 300 g. of polyvinyl chloride, 15 g. of triethylamine, and 1200 g. of tetrahydrofuran are charged into an autoclave of 2 liter in volume and heated at 110° C. for 30 minutes to prepare a dope. This dope is cast onto a glass or stainless steel plate to form a raw sheet or film usually of 50–200 micron in thickness. It is not necessary to dry up the raw sheet completely, because the solvent will be completely removed in the subsequent step of heating treatment.

Plasticizers may be added, if necessary, to increase drying rate and stretchability of the raw sheet or mechanical strength of the product. As the N-containing organic compounds are weakly basic, the sorts of plasticizers to be employed are almost without limitation.

The plasticizers employed in the present invention include phthalic esters such as dibutyl phthalate, di-n-hexyl phthalate, di-n-octyl phthalate, di-2-ethyl-hexyl phthalate, butyl benzyl phthalate and ethoxyethyl phthalate; dibasic acid esters such as isobutyl, n-hexyl, n-nonyl, n-octyl and 2-ethyl-hexyl esters of adipic, sebasic and azelaic acid; phosphoric acid esters such as tricresyl phosphate, triphenyl phosphate, tri-n-octyl phosphate, tri-2-ethyl-hexyl phosphate and tri-n-nonyl phosphate; glycol esters such as butylphthalyl butyl glycolate, nonyl-diglycolate, triethylene glycol di-2-ethyl hexenoate and polyethylene glycol di-2-ethyl hexenoate; higher fatty acid esters such as oleic acid methyl ester and cetyl methyl recinolate; epoxy fatty acid esters such as epoxy butyl oleate, epoxy triglyceride, epoxy octyl oleate and epoxy soybean oil; and chlorinated derivatives such as chlorinated paraffin and chlorinated diphenyl.

The amount of the plasticizer to be used ranges 0–50 parts by weight per 100 parts by weight of the vinyl chloride polymer. Use of more than 50 parts is undesirable, because significant aging deteriorations occur in desired properties of the product.

Dyes or ultra-violet absorbents may be added within the conditions that do not harm the effects of the present invention.

The raw sheet thus prepared is subsequently subjected to heating treatment at 70–220° C. By this heating, the sheet colors and polyenes as light-polarizing elements are produced. The color of the sheet varies from blue to purple to red as the heating temperature is elevated. Below 70° C., the production rate of polyenes is nearly zero and no coloring of the sheet takes place even after heating for several hours. The heating above 220° C. is not desirable because heat decomposition of the vinyl chloride polymer is remarkable, which results in a decrease in dichroism and reduction of stretchability. Heating time may be reduced as the temperature is elevated. By selecting heating time and temperature adequately, it is possible to change the color and the percent transmission of the product as desired.

Next, the colored sheet is subjected to stretching treatment at 90–130° C. by means of rolls, tenter or the like to orient the polyenes substantially in one direction. Thus, the colored sheet is imparted with dichroism and shows abilities as light-polarizing films.

The dichroism can be varied in a wide range by changing the stretching ratio, though it also depends on the percent transmission of the products. The stretching ratio, therefore, may be chosen adequately depending on the desired product. However, if the sheet is not subjected to stretching, it never shows dichroism. It is also undesirable to stretch the sheet in two directions.

It is likewise possible to make light-polarizing films by way of stretching the raw sheet containing the N-containing organic compound in one direction and then heating the stretched sheet.

Particularly, the raw sheet is first subjected to stretching at 80–130° C. to orient the polymer molecules substantially in one direction. The stretched film is then subjected to heating at preferably 70–150° C. under tension to form polyenes. By this heating treatment under tension, the film colors reddish purple to blue and shows dichroism. Above 150° C. breaks of film may happen in some cases.

In this embodiment, the percent transmission and the degree of polarization can be varied in a wide range by changing the stretching ratio and the heating conditions.

As stated above, according to the present invention, any of the two embodiments, either heating and then stretching or stretching and then heating, may be employed, though the former is preferred. In the former embodiment, the heating treatment is applied to the raw sheet so that no breaks of film occur, which brings the advantage of a higher yield of the product.

The light-polarizing films according to the present invention are uniform in optical properties over a wide area. The films have a color in the range of blue-purple-reddish orange and the maximum absorption spectrum in the range of 480–610 millimicrons, and show remarkable dichroism throughout all of the visible spectrum. The dichroism can be varied in a wide range particularly by changing the stretching ratio and the concentration of polarizing elements, that is, produced polyene, which concentration depends on heating conditions. Thus, the films having a high degree of polarization of 70% or more can be easily obtained.

Herein, the percent transmission and the degree of polarization to indicate the abilities of the light-polarizing films were determined as follows:

An incident light from a tungsten lamp is let to pass through a sample film. The transmitting light is passed through an analyzer and then accepted by a photomultiplier tube, the intensity of the accepted light being measured with a galvanometer. The present transmission $k_1$ and $k_2$ were measured by rotating the sample film so as to make the absorption axes of both sample and analyzer parallel and perpendicular, respectively, and the percent transmission $k$ and the degree of polarization $V$ were calculated according to the following formulae:

$$k=(k_1+k_2)/2$$
$$V=(k_1-k_2)/(k_1+k_2)$$

The light-polarizing films of the present invention are resistant to acids, alkalis and ordinary organic solvents and are excellent in water-resisting properties. The conventional light-polarizing films obtained by way of dying polyvinyl alcohol with iodine or the like fade out in water in a few days and lose abilities as light-polarizing film, even if they are laminated with other plastic sheet. On the contrary, the films of the present invention stand in water for more than several months without any change. When laminated with other plastic sheets to improve light-resistance, they withstand outdoor uses for an extended period of time.

The light-polarizing films of the present invention are tough, elastic and excellent in other mechanical properties, accordingly, they can be easily subjected to after-processing such as laminating, coating and the like.

In general, dehydrochlorinations of polyvinyl chloride in solutions with alkali amides, alcoholates, phenolates, organo-metallic compounds or metal halides are well known as methods to form polyenes. These prior methods, however, simply air to produce polyenes but not to make light-polarizing films. Black colored polyenes obtained with alkali amides or alcoholates are no longer soluble in solvents and are unstable in the air. Therefore, it is impossible to make light-polarizing films therefrom. On the other hand, organo-metallic compounds or metal halides which give relatively bluish polyenes are believed to initiate the dehydrochlorination reaction only after forming complexes with solvents and hardly react in the state of sheet.

Even if yellow to reddish brown products are formed in some cases with the above reagents, the extent of conjugation in polyenes is small and the abilities as light-polarizing film are inferior. In fact, light-polarizing films having excellent abilities can not be made by any of the known polyene-forming methods.

On the contrary, according to the present invention, it is possible to conveniently produce polyenes having colors in the range of blue-purple-reddish orange. It should be noted that in cases where the reaction is carried out in solution, no large extent of conjugation in polyenes is obtained even under the same conditions (conversion agent, temperature, etc.) as in the present invention, and the products are only reddish brown at 140–150° C. It is exclusively in the sheet form that the reaction gives sufficiently large extent of conjugation in polyenes. Accordingly, the reactions in the present invention of vinyl chloride polymers with N-containing organic compounds in the sheet form are novel also as polyene forming method.

The following examples are merely for the purpose of explanation of the present invention and should not be understood to limit the scope of the present invention.

EXAMPLE 1

An autoclave of two liter in volume was charged with 300 g. of polyvinyl chloride, 15 g. of triethylamine, 60 g. of dioctyl phthalate and 1200 g. of tetrahydrofuran and heated at 110° C. for 30 minutes to dissolve the polymer. The dope thus obtained was cast onto a glass plate and dried at 60° C. for 6 hours to prepare a sheet of 150 micron in thickness and of 30 x 40 cm. in size. This sheet was first subjected to heating treatment in an air bath at 140° C. for 11 minutes. The sheet colored deep purple. The sheet was then subjected to stretching with a small laboratory tenter at 105° C. in one direction to five times the original length. The light-polarizing film thus obtained had thickness of 33 microns, colored purple and showed good dichroism throughout all of the visible spectrum. The percent transmission and the degree of polarization of the film were 30% and 80%, respectively.

EXAMPLES 2–15

By the similar procedures as in Example 1, but under the various conditions shown in Table 1, polyvinyl chloride sheets containing various N-containing organic compounds were prepared from tetrahydrofuran solutions, and subjected to heating treatment and then to stretching. The light-polarizing films thus obtained showed good dichroism throughout all of the visible spectrum. The properties of the films are shown in Table 2.

REFERENCE EXAMPLES 1–4

Comparative experiments were carried out, using N-containing organic compounds which are solid at the room temperature (Reference Examples 1 and 2); using a strong alkali as inverting agent (Reference Example 3); and using a copolymer whose vinyl chloride content is insufficient (Reference Example 4).

By the similar procedures as in Example 1, vinyl chloride polymer sheets of 120 micron in thickness containing inverting agents were prepared from tetrahydrofuran solutions, and subjected to heating treatment at 140° C. and then to stretching at 110° C. to four times.

The experimental conditions and the properties of the products are shown in Table 3. None of the products was satisfactory as light-polarizing film.

REFERENCE EXAMPLES 5 AND 6

Films were prepared by the similar procedures as in Example 1 using 300 g. of vinyl chloride, 15 g. of triethylamine and 1200 g. of tetrahydrofuran but adopting inadequate heating temperatures. The conditions upon preparing the films and the rseults obtained are shown in Table 4 and Table 5, respectively. In Reference Example 5, the film was heated at a low temperature of 65° C. The film obtained was without substantial coloring and no production of polyenes was observed. Therefore, any stretching treatment was not applied.

In Reference Example 6, the film was heated at a high temperature of 230° C. and then was stretched. Heat decomposition of polyvinyl chloride itself reduced the stretchability of the film. The film was brownish and inferior in abilities as light-polarizing film, because the extent of conjugation in polyenes is small.

EXAMPLE 16

An autoclave of two liter in volume was charged with 300 g. of polyvinyl chloride, 15 g. of triethylamine, 30 g. of dioctylphthalate and 1200 g. of tetrahydrofuran and heated at 110° C. for 30 minutes to dissolve the polymer. The dope thus obtained was cast onto a glass plate and dried at 60° C. for 6 hours to prepare a sheet of 120 microns in thickness. This sheet was first subjected to stretching with a small laboratory tenter at 95° C. in one direction to four times the original length. The stretched film was then subjected to heating treatment under tension in an air bath at 120° C. for 32 minutes. The light-polarizing film thus obtained colored bluish, and showed good dichroism throughout all of the visible spectrum. The percent transmission and the degree of polarization of the film were 25% and 78%, respectively.

EXAMPLES 17–29

By the similar procedures as in Example 16 but under the various conditions shown in Table 6, polyvinyl chloride sheets containing various N-containing organic compounds were prepared from tetrahydrofuran solutions, and subjected to stretching and then to heating treatment under tension. The light-polarizing films thus obtained showed good dichroism throughout all of the visible spectrum. The properties of the films are shown in Table 7.

REFERENCE EXAMPLES 7–10

Comparative experiments were carried out, using N-containing organic compounds which are solid at the room temperature (Reference Examples 7 and 8); using a strong alkali as inverting agent (Reference Example 9); and using a chlorinated polyvinyl chloride whose chlorine content is more than 62% by weight (Reference Example 10).

By the similar procedures as in Example 16, vinyl chloride polymer sheets of 120 micron in thickness containing inverting agents were prepared from tetrahydrofuran solutions, and subjected to stretching at 100° C. to four times and then to heating treatment under tention. The experimental conditions and the properties of the products are shown in Table 8. None of the products was satisfactory as light-polarizing film.

REFERENCE EXAMPLES 11 AND 12

Films were prepared by the similar procedures as in Example 16 using 300 g. of vinyl chloride, 15 g. of triethylamine and 1200 g. of tetrahydrofuran but adopting inadequate heating temperatures. The conditions upon preparing the films and the results obtained are shown in Tables 9 and 10, respectively.

In Reference Example 11, the stretched film was heated at a low temperature of 65° C. The product was without substantial coloring and has no light-polarizing abilities.

In Reference Example 12, the stretched film was heated at a high temperature of 225° C. The film was instantly broken in the heating treatment to form no light-polarizing film.

REFERENCE EXAMPLE 13

A pressure proof sealing tube was charged with 5 g. of polyvinyl chloride, 0.25 g. of triethylamine and 40 g. of tetrahydrofuran and heated at 140° C. for one hour. The dope thus obtained was reddish-brown. A sheet of 120 microns in thickness was prepared from the dope and the sheet was stretched at 110° C. to four times without any heat treatment thereafter. The film obtained was brownish and the percent transmission and the degree of polarization were 62% and 15%, respectively. Thus, no light-polarizing film could be obtained.

REFERENCE EXAMPLE 14

A pressure proof sealing tube was charged with 1.5 g. of polyvinyl chloride, and 30 g. of tetrahydrofuran and then added with 20 ml. of 0.5% ammonia solution of sodium metal. The reaction immediately started at the room temperature and the solution changed to black color, forming insoluble precipitates in part. A sheet was prepared from the solution, but the black precipitates remained heterogeneously in the sheet. Thus, it was impossible to obtain any light-polarizing film.

TABLE 1

| Example No.: | N-containing organic compound Parts [2] | Plasticizer | Parts [1] | Raw sheet thickness (micron) | Heating Temperature, ° C. | Heating Time, min. | Stretching Temperature, ° C. | Stretching Ratio, times |
|---|---|---|---|---|---|---|---|---|
| 2 | n-Butylamine | 5 | | 120 | 140 | 39 | 110 | 4 |
| 3 | Diethylamine | 5 | | 90 | 140 | 43 | 110 | 3 |
| 4 | Triethylamine | 5 | | 70 | 140 | 9 | 110 | 2 |
| 5 | Ethylene diamine | 5 | | 150 | 140 | 33 | 110 | 5 |
| 6 | Aniline | 4 | | 120 | 185 | 3 | 110 | 4 |
| 7 | α-Picoline | 5 | | 120 | 160 | 8 | 110 | 4 |
| 8 [2] | Triethylamine | 5 | Di-2-ethyl-hexyl sebacate | 30 | 150 | 140 | 20 | 100 | 5 |
| 9 [3] | do | 5 | Chlorinated paraffin | 10 | 150 | 140 | 12 | 110 | 5 |
| 10 [4] | do | 5 | | | 120 | 120 | 34 | 110 | 4 |
| 11 [5] | do | 5 | | | 120 | 160 | 4 | 110 | 4 |
| 12 | do | 0.16 | Dioctylphthalate | 10 | 120 | 120 | 180 | — | — |
| 13 | do | 1.6 | do | 10 | 120 | 120 | 40 | 110 | 4 |
| 14 | do | 10 | do | 10 | 120 | 120 | 33 | 110 | 4 |
| 15 | do | 33 | do | 10 | 120 | 120 | 30 | 110 | 4 |

[1] Parts per 100 parts of polymer by weight.
[2] Solvent, acetone-benzene 1:1 mixture in place of tetrahydrofuran.
[3] Solvent, methyl ethyl ketone in place of tetrahydrofuran.
[4] Copolymer of 2 wt. percent ethylene and 98 wt. percent vinyl chloride was used in place of polyvinyl chloride.
[5] Copolymer of 5 wt. percent vinyl acetate and 95 wt. percent vinyl chloride was used in place of polyvinyl chloride.

TABLE 2

| Example No.: | Product film thickness (micron) | Percent transmission (percent) | Degree of polarization (percent) | Color | Remarks |
|---|---|---|---|---|---|
| 2 | 32 | 25 | 75 | Purple | |
| 3 | 30 | 20 | 71 | ...do... | |
| 4 | 34 | 15 | 52 | ...do... | |
| 5 | 33 | 35 | 70 | ...do... | |
| 6 | 34 | 21 | 79 | Reddish orange | |
| 7 | 34 | 28 | 76 | Reddish purple | |
| 8 | 35 | 35 | 72 | Bluish purple | |
| 9 | 34 | 27 | 81 | Purple | |
| 10 | 31 | 33 | 65 | Blue | |
| 11 | 32 | 18 | 82 | Reddish purple | |
| 12 | | | | | Almost colorless |
| 13 | 34 | 31 | 67 | Blue | |
| 14 | 31 | 30 | 67 | ...do... | |
| 15 | 32 | 35 | 51 | Orange | |

TABLE 3

| Reference Example No.: | Inverting agent | Parts[1] | Heating time (min.) | Percent transmission (percent) | Degree of polarization (percent) | Color | Product film thickness (micron) | Remarks |
|---|---|---|---|---|---|---|---|---|
| 1 | Sodium amide | 3 | 7 | 22 | 76 | Reddish purple | 35 | (A) |
| 2 | Piperadine | 3 | 12 | 20 | 74 | ...do... | 34 | (B) |
| 3 | 40% aqueous solution of trimethyl-benzyl ammonium hydroxide. | 2 | [2]20 | 28 | 68 | Blue | 33 | (C) |
| 4[3] | Triethylamine | 5 | 7 | 24 | 53 | Orange | 35 | (D) |

[1] Parts per 100 parts of polymer by weight.
[2] Heating temperature, 120° C.
[3] Copolymer of 25 wt. percent vinyl acetate and 75 wt. percent vinyl chloride was used in place of polyvinyl chloride.
NOTE.—(A) Precipitates formed during dope preparation. Poor uniformity of film. (B) Piperadine crystals deposited out in the film. Poor uniformity of film. (C) Precipitates formed in the dope. Opaque film. (D) Shows dichroism only in narrow range of spectrum. Poor light-polarizing abilities.

TABLE 4

| Reference Example No.: | N-containing organic compound | Parts* | Raw sheet thickness (micron) | Heating Temperature, °C. | Heating Time, min. | Stretching Temperature, °C. | Stretching Ratio, times | Stretching Thickness, micron |
|---|---|---|---|---|---|---|---|---|
| 5 | Triethylamine | 5 | 120 | 65 | 180 | | | |
| 6 | ...do... | 5 | 120 | 230 | 2 | 120 | 3 | 43 |

*Parts per 100 parts of polymer by weight.

TABLE 5

| Reference Example No.: | Percent transmission (percent) | Degree of polarization (percent) | Color | Remarks |
|---|---|---|---|---|
| 5 | | | | Almost colorless. |
| 6 | 38 | 32 | Brown | Low stretchability, poor polarizing abilities. |

TABLE 6

| Example No.: | N-containing organic compound | Parts[1] | Plasticizer | Parts[1] | Raw sheet thickness (micron) | Streching Temperature, °C. | Streching Ratio, times | Heating Temperature, °C. | Heating Time, min. |
|---|---|---|---|---|---|---|---|---|---|
| 17 | n-Butylamine | 5 | | | 70 | 100 | 2 | 140 | 60 |
| 18 | Di-n-propylamine | 5 | | | 90 | 100 | 3 | 140 | 60 |
| 19 | Triethylamine | 5 | | | 120 | 100 | 4 | 110 | 50 |
| 20 | Cyclohexylamine | 5 | | | 150 | 100 | 5 | 140 | 60 |
| 21 | Pyridine | 5 | | | 120 | 100 | 4 | 140 | 50 |
| 22[2] | Triethylamine | 5 | Tricresyl phosphate | 30 | 150 | 90 | 5 | 120 | 45 |
| 23[3] | ...do... | 5 | Dioctyl adipate | 20 | 150 | 90 | 5 | 120 | 38 |
| 24[4] | ...do... | 5 | | | 120 | 100 | 4 | 130 | 12 |
| 25[5] | ...do... | 5 | | | 120 | 100 | 4 | 120 | 20 |
| 26 | ...do... | 0.16 | Dioctyl phthalate | 10 | 150 | 95 | 5 | 120 | 180 |
| 27 | ...do... | 1.6 | ...do... | 10 | 150 | 95 | 5 | 120 | 32 |
| 28 | ...do... | 10 | ...do... | 10 | 150 | 95 | 5 | 120 | 25 |
| 29 | ...do... | 33 | ...do... | 10 | 150 | 95 | 5 | 120 | 30 |

[1] Parts per 100 parts of polymer by weight.
[2] Solvent, acetone-benzene 1:1 mixture in place of tetrahydrofuran.
[3] Solvent, methyl ethyl ketone in place of tetrahydrofuran.
[4] Copolymer of 3 wt. percent acrylonitrile and 97 wt. percent vinyl chloride was used in place of polyvinyl chloride.
[5] Copolymer of 3 wt. percent vinyl stearyl ether and 97 wt. percent vinyl chloride was used in place of polyvinyl chloride.

TABLE 7

| Example No.: | Product Film thickness (micron) | Percent transmission (percent) | Degree of polarization (percent) | Color | Remarks |
|---|---|---|---|---|---|
| 17 | 35 | 25 | 41 | Purple | |
| 18 | 30 | 30 | 57 | do | |
| 19 | 34 | 26 | 71 | Blue | |
| 20 | 32 | 25 | 84 | Reddish purple | |
| 21 | 32 | 31 | 68 | do | |
| 22 | 32 | 30 | 76 | Blue | |
| 23 | 34 | 35 | 70 | do | |
| 24 | 32 | 26 | 72 | Purple | |
| 25 | 34 | 22 | 81 | Blue | |
| 26 | 33 | | | | Colorless. |
| 27 | 32 | 30 | 79 | Blue | |
| 28 | 36 | 35 | 70 | do | |
| 29 | 32 | 36 | 60 | Orange | |

TABLE 8

| | | | Heating | | Product film thickness (micron) | Percent transmission (percent) | Degree of polarization (percent) | Color | Remarks |
|---|---|---|---|---|---|---|---|---|---|
| Inverting agent | | Parts[1] | Temperature, °C. | Time (min.) | | | | | |
| Reference Example No.: | | | | | | | | | |
| 7 | Sodium ethylate | 3 | 115 | 36 | 34 | 19 | 55 | Purple | (A) |
| 8 | Piperidine | 3 | 120 | 30 | 31 | 22 | 72 | Bluish purple | (B) |
| 9 | 40% aqueous solution of trimethyl benzyl ammonium hydroxide. | 2 | 120 | 20 | 33 | 30 | 65 | Blue | (C) |
| 10[2] | Triethylamine | 5 | 120 | 30 | 35 | 38 | 62 | Yellowish brown | (D) |

[1] Parts per 100 parts of polymer by weight.
[2] Chlorinated polyvinyl chloride containing chlorine of 64% was used in place of polyvinyl chloride.

NOTE.—(A) Precipitates formed during dope preparation. Poor uniformity of film. (B) Piperidine crystals deposited in the film. Poor uniformity of film. (C) Precipitates formed in the dope. Opaque film. (D) Shows dichroism only in narrow range of spectrum. Poor light-polarizing abilities.

TABLE 9

| | | Raw sheet Thickness (micron) | Stretching | | | Heating | |
|---|---|---|---|---|---|---|---|
| N-containing organic compound | Parts* | | Temperature, °C. | Ratio (times) | Thickness (micron) | Temperature, °C. | Time (min.) |
| Reference Example No.: | | | | | | | |
| 11 | Triethylamine | 5 | 120 | 100 | 4 | 33 | 65 | 180 |
| 12 | do | 5 | 120 | 100 | 4 | 34 | 225 | |

* Parts per 100 parts of polymer by weight.

TABLE 10

| | Percent Transmission (percent) | Degree of polarization (percent) | Color | Remarks |
|---|---|---|---|---|
| Reference Example No.: | | | | |
| 11 | | | | Almost colorless. |
| 12 | | | | Film instantly broken. |

What is claimed is:

1. A process for making light-polarizing films showing dichroism throughout all of the visible spectrum which comprises casting a solution containing (1) a vinyl chloride polymer comprising at least 80% vinyl chloride, (2) A nitrogen-containing organic compound selected from the group consisting of aliphatic monamines, aliphatic diamines, aromatic amines, the aromatic amine being selected from aniline, N-methyl aniline, N-ethyl aniline, N,N-dimethyl aniline and N,N-diethyl aniline, and nitrogen-containing heterocyclic compounds, the compound being selected from pyridine, picoline, lutidine, piperidine, pyrrolidine, N-methyl pyrrolidine and morpholine, and (3) an inert organic solvent for the said polymer to prepare a vinyl chloride polymer sheet, and subjecting said sheet to heating at a temperature of from 70–220° C. and stretching in one direction, the said nitrogen-containing organic compound being liquid at room temperature, having a boiling point not higher than the said heating temperature and acting as a weekly basic nucleophilic or a conversion agent and being used in an amount of $\frac{1}{10}$–$\frac{1}{500}$ mole per one gram atom of combined chlorine contained in the vinyl chloride polymer.

2. The process of claim 1 wherein the said vinyl chloride polymer sheet is first subjected to heating at a temperature of 70–220° C. and then to stretching in one direction.

3. The process of claim 1 wherein the said vinyl chloride polymer sheet is first subjected to stretching in one direction and then to heating at a temperature of 70–150° C. under tension.

4. The process of claim 1 wherein the vinyl chloride polymer is vinyl chloride homopolymer.

5. The process of claim 1 wherein the vinyl chloride polymer is a copolymer of vinyl chloride and a unsaturated compound copolymerizable with vinyl chloride.

6. The process of claim 1 wherein the nitrogen-containing organic compound is an aliphatic mono- or di-amine.

7. The process of claim 1 wherein the nitrogen-containing organic compound is an aromatic amine.

8. The process of claim 1 wherein the stretching ratio is in the range of 1.5–8.

References Cited

UNITED STATES PATENTS

| | | | |
|---|---|---|---|
| 1,921,326 | 8/1933 | Robertson | 260—92.8 |
| 2,103,581 | 12/1937 | Gray | 260—92.8 |
| 2,405,008 | 7/1946 | Berry et al. | 260—92.8 |
| 2,427,070 | 9/1947 | Reuter | 260—92.8 |
| 2,427,071 | 9/1947 | Reuter | 260—92.8 |
| 2,476,832 | 7/1949 | Donia | 260—92.8 |
| 2,572,315 | 10/1951 | Campbell | 264—2 |
| 2,606,177 | 8/1952 | Downing | 260—92.8 |
| 2,624,239 | 1/1953 | Blout et al. | 260—92.8 |
| 3,183,207 | 5/1965 | Mimoy et al. | 260—92.8 |

JULIUS FROME, Primary Examiner

A. H. KOECKERT, Assistant Examiner

U.S. Cl. X.R.

260—92.8; 264—216; 350—154